United States Patent [19]

Ozawa et al.

[11] Patent Number: 5,107,296
[45] Date of Patent: Apr. 21, 1992

[54] PHOTOGRAPHIC PAPER TRANSPORTING APPARATUS AND METHOD FOR PHOTOGRAPHIC PRINTER

[75] Inventors: Yoshio Ozawa, Kanagawa; Takashi Matsumoto, Saitama, both of Japan

[73] Assignee: Fuji Photo Film Co., Ltd., Kanagawa, Japan

[21] Appl. No.: 683,912

[22] Filed: Apr. 11, 1991

[30] Foreign Application Priority Data

| Apr. 13, 1990 [JP] | Japan | 2-98167 |
| Apr. 13, 1990 [JP] | Japan | 2-98168 |
| Apr. 13, 1990 [JP] | Japan | 2-98169 |

[51] Int. Cl.$^5$ .............................................. G03B 29/00
[52] U.S. Cl. .................................. 355/28; 355/29; 355/72
[58] Field of Search ........................ 355/28, 29, 72

[56] References Cited

U.S. PATENT DOCUMENTS

| 3,500,734 | 3/1970 | Lewis et al. | 355/28 |
| 4,819,024 | 4/1989 | Kagayama et al. | 355/28 |

*Primary Examiner*—Monroe H. Hayes
*Attorney, Agent, or Firm*—Sughrue, Mion, Zinn, Macpeak & Seas

[57] ABSTRACT

An apparatus for transporting a photographic paper having an epicyclic gear clutch mechanism for transmitting the rotation of a motor selectively to a magazine and a pair of nip rollers. In auto-loading of the photographic paper, the nip rollers are rotated by the motor to feed the leading end of the photographic paper to the exposure station. If a magazine is exchanged before the whole photographic paper is used, the photographic paper is cut at a position upstream of the last picture frame. In the first paper winding operation, the rotation of the motor is transmitted via the epicyclic gear clutch mechanism to the magazine to wind the unprinted portion of the photographic paper into the magazine. When the leading end of the photographic paper is returned back near the tip rollers, the epicyclic gear clutch mechanism is coupled to the nip rollers. In a second paper winding operation, the nip rollers are rotated reversely until the photographic paper detaches from the nip rollers. According to a preferred embodiment, the rotation of the motor is stopped when the leading end of the photographic paper nears the nip rollers. Immediately thereafter, the epicyclic gear clutch mechanism is coupled to the nip rollers to prevent the photographic paper roll from being rotated by the inertia. When the nip rollers are moved to the nip release position, the leading end of the photographic paper is released from the nip state, thereby allowing the magazine to be unloaded from the magazine chamber.

27 Claims, 9 Drawing Sheets

PHOTOGRAPHIC PAPER TRANSPORTING APPARATUS AND METHOD FOR PHOTOGRAPHIC PRINTER

BACKGROUND OF THE INVENTION

The present invention relates to a photographic paper transporting apparatus and method for photographic printers. More particularly, the invention relates to a photographic paper transporting apparatus and method for automatically winding a photographic paper which has extended from a magazine storing a paper roll to a printer unit, prior to exchanging the magazine.

A photographic printer is equipped with a photographic paper transporting apparatus for pulling photographic paper (hereinafter simply called paper) out of a magazine storing a roll of paper and transporting it to an exposure station. There are disposable type magazines and paper re-loading type magazines. The disposable type magazine, such as a corrugated cardboard magazine, stores therein a self-coiled paper roll. In such a magazine, when the width of a paper having a glossy or silk-finish surface or the like is changed, or when a printing operation is finished, the paper is cut near at a paper outlet of the magazine in the case of a disposable type magazine. The paper re-loading type magazine rotatably supports a winding shaft on which a paper is coiled. In such a magazine, the paper is cut at a position upstream of a printed picture frame, and the unprinted or unexposed upstream paper is wound about the winding shaft by rotating the winding shaft reversely. This reverse rotation of the winding shaft is performed manually, or is done automatically using a motor.

If the winding shaft is rotated reversely using a motor to wind the paper about the winding shaft, two motors—one for feeding the paper and one for winding the paper—are required, resulting in a high manufacturing cost. Further, precise control of the motor is necessary, to avoid having the leading end of the paper retracted completely the magazine because of rotation inertia of the paper roll. If the paper leading end fully enters the magazine, it becomes necessary to pull it out from the magazine, resulting in considerable much labor in resetting the magazine.

SUMMARY OF THE INVENTION

In view of the foregoing, it is an object of the present invention to provide a paper transporting apparatus and method capable of winding a paper into a magazine by using a single motor, which is used to feed the paper.

It is another object of the present invention to provide a paper transporting apparatus and method capable of winding a paper into a magazine such that the winding is stopped while the paper leading end is extended to a small extent out of the magazine.

The above and other objects of the present invention are achieved in the following manner. In transporting a paper to the exposure station, the rotation of a motor is transmitted to a nip roller pair which then is rotated in a direction of advance direction to pull the paper out of a magazine. In winding the paper back into the magazine, the rotation of the motor is transmitted to a winding shaft which then is rotated in the winding direction. Next, as the paper leading end comes near the nip roller pair, the rotation of the motor is switched from the winding shaft to the nip roller pair. Thereafter, the paper is entered forcibly into the magazine by the nip roller pair.

According to a preferred embodiment of this invention, when the leading end of the paper is detected with a sensor disposed in the vicinity of the nip roller pair, the motor is stopped and coupled to the nip roller pair to stop the rotation of the nip roller pair. Therefore, the paper winding operation stops under the condition that the paper leading end portion is nipped with the nip roller pair. According to another preferred embodiment of this invention, after the paper winding operation terminates under the condition that the paper leading end portion is nipped with the nip roller pair, the nip roller pair is moved to a nip release position to allow the magazine to be unloaded from a magazine chamber.

According to the present invention, a single motor is used to transmit the rotation force selectively to the nip roller pair and to the magazine winding shaft. Therefore, both the paper feeding and paper winding operations can be performed using a single motor. The stop position of the leading end of the paper is regulated by the nip roller pair, thereby improving the precision of stopping the paper leading end and preventing the paper leading end from entering the magazine because of the inertia of the paper roll. Further, the paper can be fed and wound automatically so that during the winding operation, an operator can perform another task, thereby improving overall work efficiency.

BRIEF DESCRIPTION OF THE DRAWINGS

The foregoing and other objects and advantages of the present invention will become more apparent from the following detailed description when read in connection with the accompanying drawings, in which.

DETAILED DESCRIPTION OF THE PREFERRED EMBODIMENTS

Figure 1:
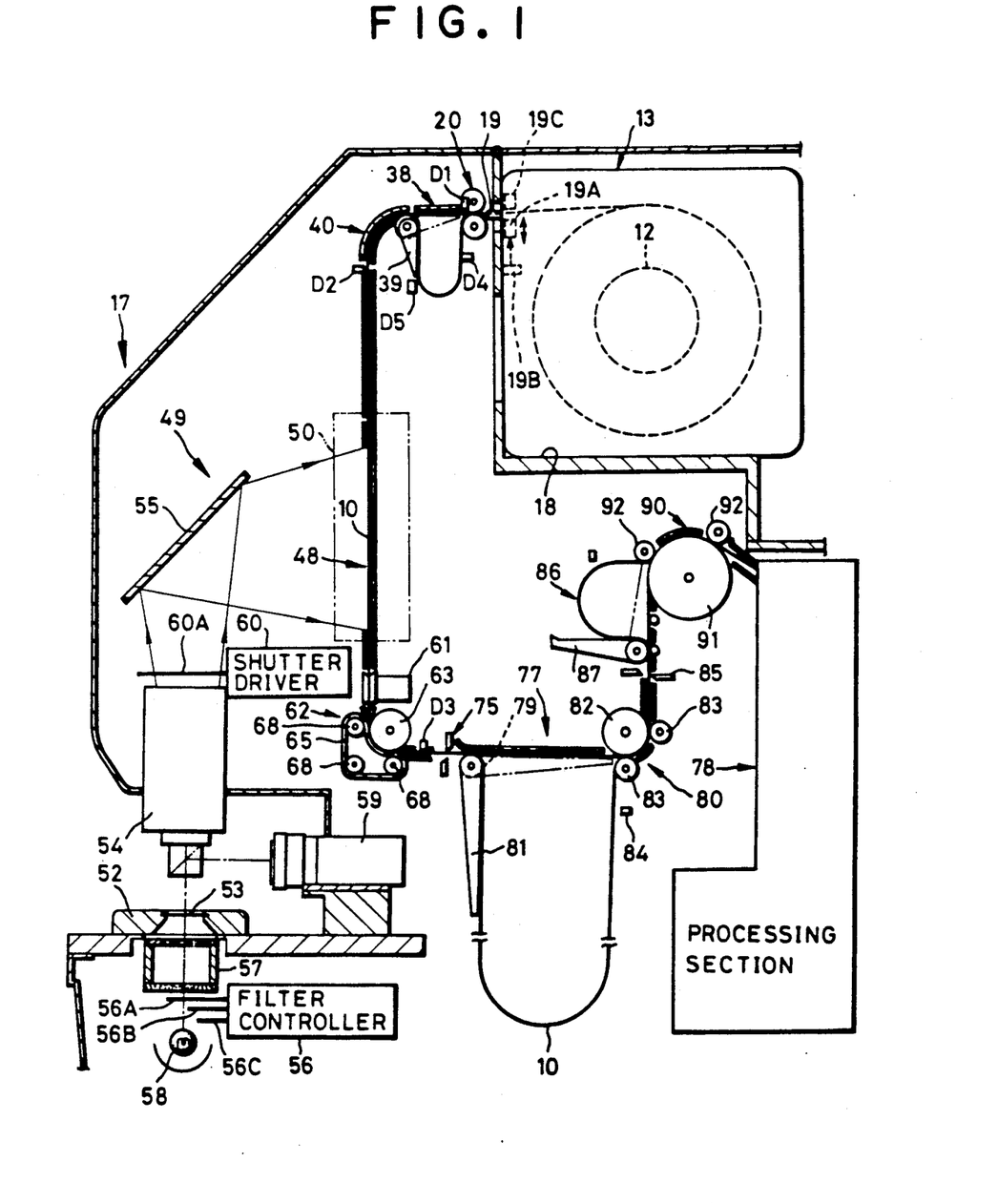
FIG. 1 is a schematic diagram showing a printer processor embodying the present invention.
Figure 2:
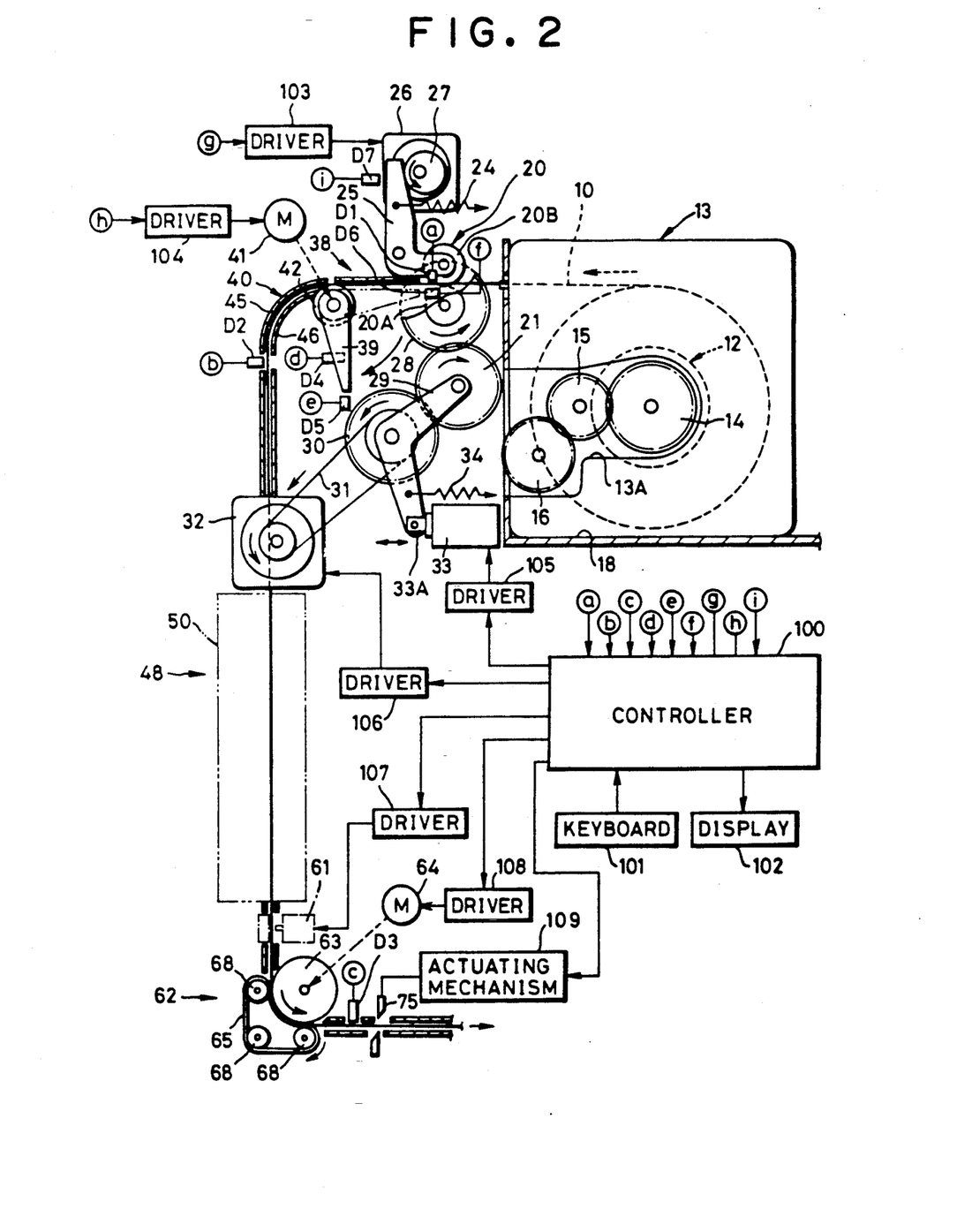
FIG. 2 is a schematic diagram showing the main part of a paper transporting apparatus used with the printer processor shown in FIG. 1.

In FIGS. 1 and 2, a paper 10 is coiled on a winding shaft 12 and stored in a magazine 13. A gear 14, connected fixedly to the winding shaft 12, is coupled via an intermediate gear 15 to a gear 16. The gears 14 to 16 are mounted rotatably within a recess 13A formed in a side wall of the magazine 13. The magazine 13 is set within a magazine chamber 18 of the printer processor 17. A pair of nip rollers 20 is disposed near a paper outlet 19 of the magazine 13. An epicyclic gear 21 is disposed near the gear 16. A slidable shutter plate 19A is mounted within the magazine 13 at the paper outlet 19. When the magazine 13 is set, a pin 19B is pushed by the wall of the magazine chamber 18 so that the shutter plate 19A moves from a closed position to an open position. In the closed position, the shutter plate 19A squeezes the paper leading end with a receiving plate 19C to hold the paper leading end in position and shield the magazine 13 from external light.

The nip roller pair 20 is constructed of a lower nip roller 20A and an upper nip roller 20B, the roller 20B moving toward or away from the roller 20A. The upper nip roller 20B is mounted on a nip release lever 25 which is biased in the clockwise direction by a spring 24. The nip release lever 25 contacts an eccentric cam 27 mounted on the shaft of a nip release motor 26 so that the nip release lever 25 swings as the eccentric cam 27 rotates. With this swing operation of the nip release lever 25, the upper nip roller 20B is pushed up so as to release the nip state. This nip release operation is executed after unprinted paper is wound into the magazine 13 so that, when another magazine 13 is set, the paper leading end protruded therefrom is allowed to be inserted between the upper and lower nip rollers 20A and 20B. The nip release operation may be executed using a solenoid in place of the motor 26 and the eccentric cam 27.

A gear 28 is mounted fixedly on the shaft of the lower nip roller 20A. The gear 28 comes into engagement with the epicyclic gear 21 when an arm 29 swings to a position to allow this engagement. The epicyclic gear 21 meshes with a sun gear 30 which is rotated by an auto-load motor 32 via a timing belt 31. The arm 29 is connected to a solenoid 33 and provided with a spring 34. When the solenoid 33 is turned off, the arm 29 is swung by the spring 34 so that the gear 28 of the lower nip roller 20A meshes with the epicyclic gear 21 to go into the loading position. When the solenoid 33 is turned on, its plunger 33A protrudes so that the gear 16 of the magazine 13 meshes with the epicyclic gear 21 to go into the winding position. The solenoid 33 causes the plunger 33A to protrude when it is turned on. Alternatively, another type of solenoid may be used which causes the plunger to retract when it is turned on. Also, while a clutch-gear mechanism is used in this embodiment, alternatively an ordinary clutch mechanism may be used for a transmission system between the motor 32 and the nip roller pair 20, and for a transmission system between the motor 32 and the gear 16.

A first loop forming section 38, provided at the left side of the nip roller pair 20, has a movable guide plate 39 which guides the paper leading end fed by the nip roller pair 20 to a paper transport section 40. After guiding the paper leading end, the movable guide plate 39 is swung downwardly by a motor 41 into a retracted position and form a space for a loop of the paper. The paper transport section 40 is constructed of a guide roller 42 and paper guides 45 and 46, and changes the feeding direction of the paper 10 by 90° from a horizontal direction to a vertical direction so that the paper 10 is guided to an exposure station 48 of a printer section 49.

The exposure station 48 is provided with a variable mask mechanism 50 which changes its mask opening in accordance with the width and print size of the paper 10. At the exposure station 48, an original picture frame of a negative film 53 set at a film carrier 52 is formed on the paper 10 by means of a printing lens 54 and a mirror 55. As is well known, a print light emanated from a light source 58 passes through a yellow filter 56A, a magenta filter 56B, and a cyan filter 56C for adjusting the proportion and intensity of three color components, and a mixing box 57 for mixing the print light, and thereafter becomes incident on the original picture frame. The insertion amount of the filters 56A to 56C into the optical path is controlled by a filter controller 56. A part of the print light transmitted through the original picture frame is incident on a scanner 59 via a prism disposed below the printing lens 54. This scanner 59 has an image area sensor which carries out three color separation and photometry at each point of the original picture frame. Various characteristic values obtained by this photometry are used for calculating the red, green, and blue exposure amounts. The setting positions of the color filters 56A to 56C and the exposure time of a shutter 60A are determined in accordance with the calculated exposure amounts.

At the downstream side of the variable mask mechanism 50, there is provided a known cut/sort marker 61 which records a cut mark such as a small hole and a sort mark between frames formed on the paper 10. Downstream of the cut/sort marker 61, a first paper feeding unit 62 is provided which is constructed of a feed roller 63, a main feed motor 64 for rotating the feed roller 63, and a guide belt 65. This first paper feeding unit 62 operates to set the unprinted paper 10 fed by the nip roller pair 20 correctly at the exposure station 48 during the paper loading operation, and transports the printed paper 10 to a second loop forming section 77 during the paper printing operation. The guide belt 65 is brought into contact with the feed roller 63 by means of three guide rollers 68, the contact area of the feed roller 63 being about one fourth of the circumference thereof. The feeding direction of the paper 10 is changed at the first feeding unit 62 from a vertical direction to a horizontal direction. Downstream of the first paper feeding unit 62, there is provided a first cutter 75 for cutting the paper 10. The cutter 75 cuts the paper 10 at the position upstream of the printed frame when the printing operation is completed or the paper 10 is exchanged for another size or surface type.

The second loop forming section 77 positioned downstream of the first cutter 75 is used for absorbing the difference between processing speeds of the printer section 49 and a processing section 78. The second loop forming section 77 has a guide roller 79 and a movable guide plate 81 for guiding the paper leading end to a second paper feeding unit 80 at the downstream position. After the paper leading end is guided to the second paper feeding unit 80, the movable guide plate 81 is swung down and set to a retracted position to form a space for a loop of the paper.

The second paper feeding unit 80 is constructed of a feed roller 82 and two guide rollers 83 in contact with the feed roller 82. After a predetermined amount of loop is formed at the second loop forming section 77, the second paper feeding unit 80 transports the printed paper to the processing section 78. Downstream of the second paper feeding unit 80, there is disposed a second cutter 85. This second cutter 85 is used when the printing operation is stopped temporarily, or when the amount of the printed paper stocked at the loop forming section 77 decreases to practically zero because of an interception of the printing operation. Downstream of the cutter 85, there is disposed a movable guide plate 87 constituting a third loop forming section 86. The movable guide plate 87 stands upright while the paper leading end passes, so as to guide it to a third paper feeding unit 90. Thereafter, the movable guide plate 87 takes a horizontal retracted position to form a space for a loop of the paper. The printed paper, corresponding in amount at least to the time required for the paper cut operation, is stocked as the paper loop so that, even if the paper 10 is stopped temporarily and cut, the printed paper 10 can be fed continuously to the processing section 78. The third paper feeding unit 90 is constructed of a feed roller 91 and two guide rollers 92 in contact with the feed roller 91. The feed roller 91 is driven by the paper transport system of the processing section 78 so that the feed roller 91 has the same transport speed as the processing section 78. The processing section 78 has a plurality of tanks. In the processing section 78, the paper is driven by the transport system mounted within the tanks, and moves at a constant speed within the tanks. During the paper transport within the tanks, the photographic processing is completed. After the drying process, the paper is cut into frames while checking cut marks to obtain photographic prints.

In the paper transport system described above, there are provided first to third paper sensors D1, D2, and D3 for detecting the paper for the purpose of paper feeding and winding. The first paper sensor D1 is disposed near to and downstream from the nip roller pair 20. The second paper sensor D2 is disposed near to and downstream from the paper transport section 40. The third paper sensor D3 is disposed near to and downstream from the first paper feeding unit 62.

At the first loop forming section 38, there are disposed a loop sensor D4 for detecting a predetermined length of the loop, and a guide open sensor D5 and guide close sensor D6 for detecting the position of the movable guide plate 39. The second and third loop forming sections 77 and 86 are provided similarly with loop sensors and guide plate sensors. The latter loop sensor and guide plate sensors are not particularly related to this invention, and so are omitted in the drawings. A nip release sensor D7 also is disposed near the nip release lever 25 for detecting a nip release state.

Signals from the sensors D1 to D7 are inputted to a controller 100 which is constructed of a well-known microcomputer and equipped with a keyboard 101 and a display 102. In response to a command entered from the keyboard 101, the controller 100 executes paper feeding, paper winding, and sequential control of the printer section 49 and the processing section 78.

The paper feeding and winding operation will be described below. The nip roller pair 20 is in the nip release state after the previous magazine was unloaded, and the upper nip roller 20B is raised. A check is made to determine whether the paper leading end of the new magazine 13 extends from the paper outlet 19 by a predetermined length. Then, the new magazine 13 is set in the magazine chamber 18. As the magazine 13 is set, the paper leading end is inserted between the nip roller pair 20, and the pin 19B is pushed back by the wall of the magazine chamber 18. In response to the movement of the pin 19B, the shutter plate 19A moves to the open position against the force of a spring (not shown) so as to free the paper leading end.

Figure 3:
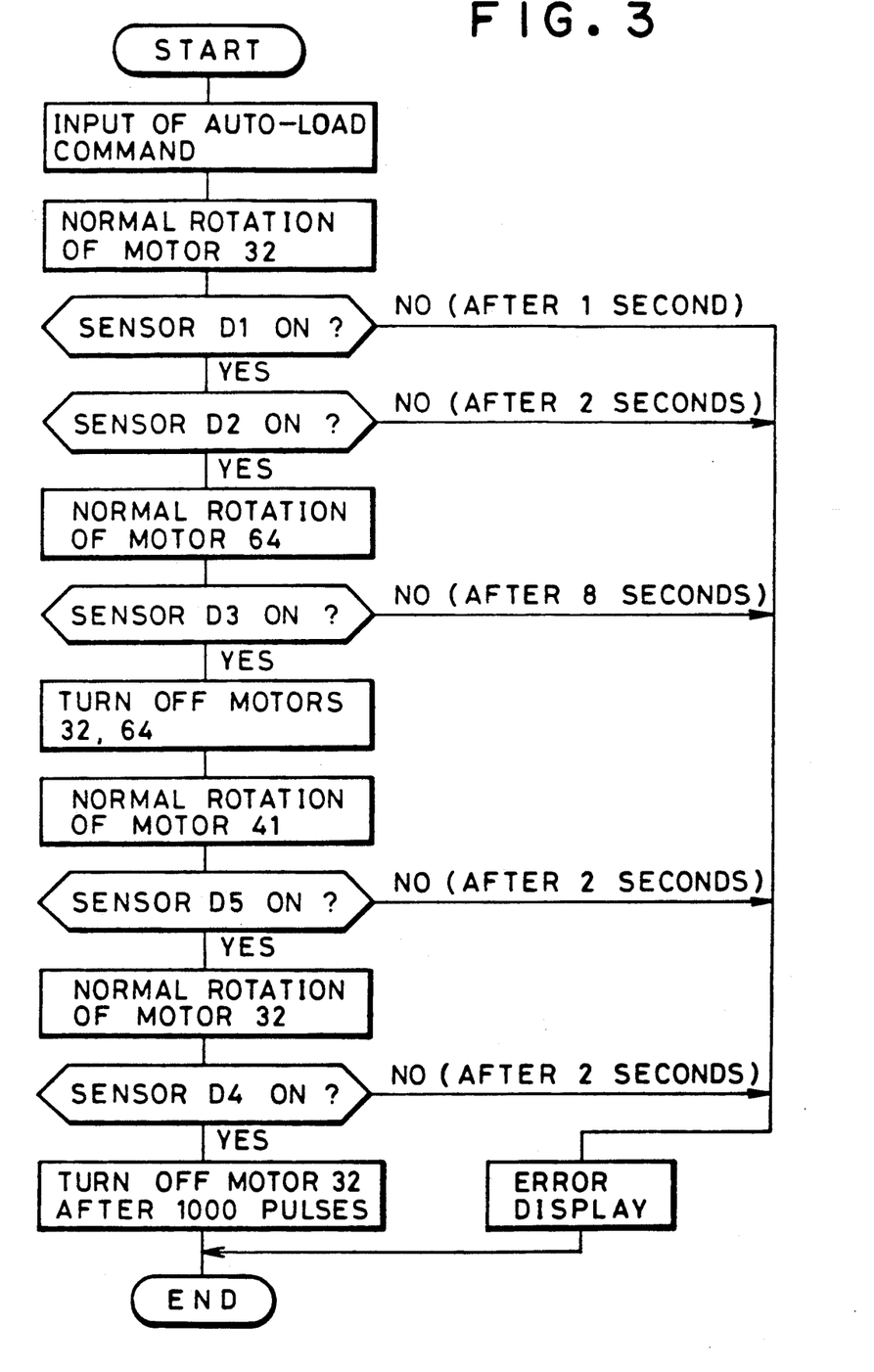
FIG. 3 is a flow chart of the control procedure performed by a controller during paper feeding.

Referring to the flow chart of FIG. 3, when an auto-load command is supplied to the controller 100 by a key input from the keyboard 101, after the controller 100 is initialized, it executes an auto-load program. First, the controller 100 operates to rotate the nip release motor 26 by half a rotation so that the upper nip roller 20B lowers and nips the paper leading end with the help of the lower nip roller 20A. At this time, the guide plate 39 at the open position is swung to the closed position to take the guide position. The solenoid 33 is turned off at this time the epicyclic gear 21 is meshing with the gear 28 of the nip roller pair 20.

The controller 100 causes the auto-load motor 32 to rotate normally so that the unprinted paper 10 is pulled out of the magazine 13 by means of the nip roller pair 20. The paper leading end then passes the first sensor D1 so that the sensor D1 turns ON. If the first paper sensor D1 does not turn ON after one second from the start of normal rotation of the motor 32, the controller 100 judges that paper feeding is not possible, and provides an error indication on the display 102 or on a CRT which provides a simulated display of a finished print.

Thereafter, the paper leading end passes the second paper sensor D2 so that the sensor D2 turns ON. If the second paper sensor D2 does not turn ON within two seconds after the paper leading end passes the first paper sensor D1, the controller 100 judges that there is a paper jam, and provides an error indication. When the second paper sensor D2 turns ON, the controller 100 causes the main feed motor 64 of the first paper feeding unit 62 to rotate normally to feed the paper leading end toward the cutter 75. As the paper leading end passes the third paper sensor D3 and turns it ON, the controller 100 stops the rotation of the auto-load motor 32 and main feed motor 64. If the third paper sensor D3 does not turn ON after 8 seconds from the start of normal rotation of the main feed motor 64, the controller 100 judges that there is a paper jam, and provides an error indication.

When the third paper sensor D3 turns ON, the controller 100 causes the guide change motor 41 to rotate so that the movable plate 39 is moved from the guide position to the retracted position. When the movable plate 39 is set at the retracted position, the guide open sensor D5 turns ON so that the controller 100 causes the auto-load motor 32 to rotate normally. When a predetermined length of loop is formed at the first loop forming section 38, the loop sensor D4 turns ON. Using this detection of ON-state as a reference, for example, after 1000 pulses from this detection, the controller 100 stops the auto-load motor 32. If the loop sensor D4 does not turn ON after one second, the controller 100 judges that there is a paper jam, and provides an error indication.

After a loop of about one frame length is formed at the first loop forming unit 38, it becomes possible to start a printing operation. When a printing operation is designated by a print key of the keyboard 101, an image of an image original picture frame on the negative film 53 is formed on the paper 10 at the exposure station 48. As is well known, in the printing operation, each point within the original picture frame is subjected to three color separation and photometry by the scanner 59, and each exposure amount is determined using the obtained three color densities at each point. After one frame is printed, the paper 10 is fed by one frame so that the printed frame goes away from the exposure station 48 and the unprinted paper 10 is set at the exposure station 48. If the loop sensor D4 turns OFF during this frame feeding because of a reduction of the loop amount at the first loop forming section 38, the controller 100 causes the auto-load motor 32 to rotate normally so that the paper 10 is pulled out of the magazine 13 until a predetermined loop amount is obtained. In the meantime, the negative film 53 also is fed by one frame so that the next original picture frame to be printed is set at the printing station. The above operations are repeated to print one frame after another on the paper 10.

The printed paper 10 is recorded with a cut mark between frames and a sort mark for each order by means of the cut/sort marker 61. When a predetermined amount of loop is formed at the second loop forming section 77, the second and third paper feeding units 80 and 90 start operating so that the paper leading end is fed toward the processing section 78. When the paper leading end reaches the outer circumference of the roller 91, the roller 91 stops and the guide plate 87 changes its position. Therefore, a loop is formed at the third loop forming section 86. When a predetermined amount of loop is formed, the roller 91 starts rotating again to feed the paper leading end into the processing unit 78. While loops are formed at the second and third loop forming sections 77 and 86, a printing operation is carried out intermittently, and the printed paper is supplied continuously to the processing unit 78. The processing unit 78 processes the paper with various photographic processing solutions and cuts the paper 10 frame by frame in accordance with the cut marks, in a well-known manner.

The processing section 78 carries out the developing process continuously while feeding the paper at a constant speed. As a result, if the printing operation is intercepted temporarily, the loop amount at the second loop forming section 77 will decrease. This decrease is detected with the loop sensor 84. The controller 100 stops the second paper feed unit 80 to cut the paper 10 with the second cutter 85 at the cut mark position. During this cut operation, the third paper feed unit 90 continues to operate to allow continuous feed of the paper stocked at the third loop forming section 86 to the processing section 78. As a result, the developing operation at the processing section 78 will not be intercepted by the interception of the printing operation.

In the case where the printing operation is completed or the paper is to be exchanged, a winding instruction is entered from the keyboard 101. The controller 100 then controls the apparatus elements in accordance with the flow chart shown in FIG. 4. First, a check is made to determine checked whether operational control has ceased immediately after the printing operation. If the control has ceased immediately after the printing operation, a predetermined length of paper is fed by the first paper feeding unit 62. The cut mark after the last frame is set at the cut station to cut the paper 10 with the cutter 75, so that the paper 10 is separated into unprinted and printed paper. The printed paper 10 is fed continuously fed via the second and third paper feeding units 80 and 90 to the processing section 78.

Figure 4:
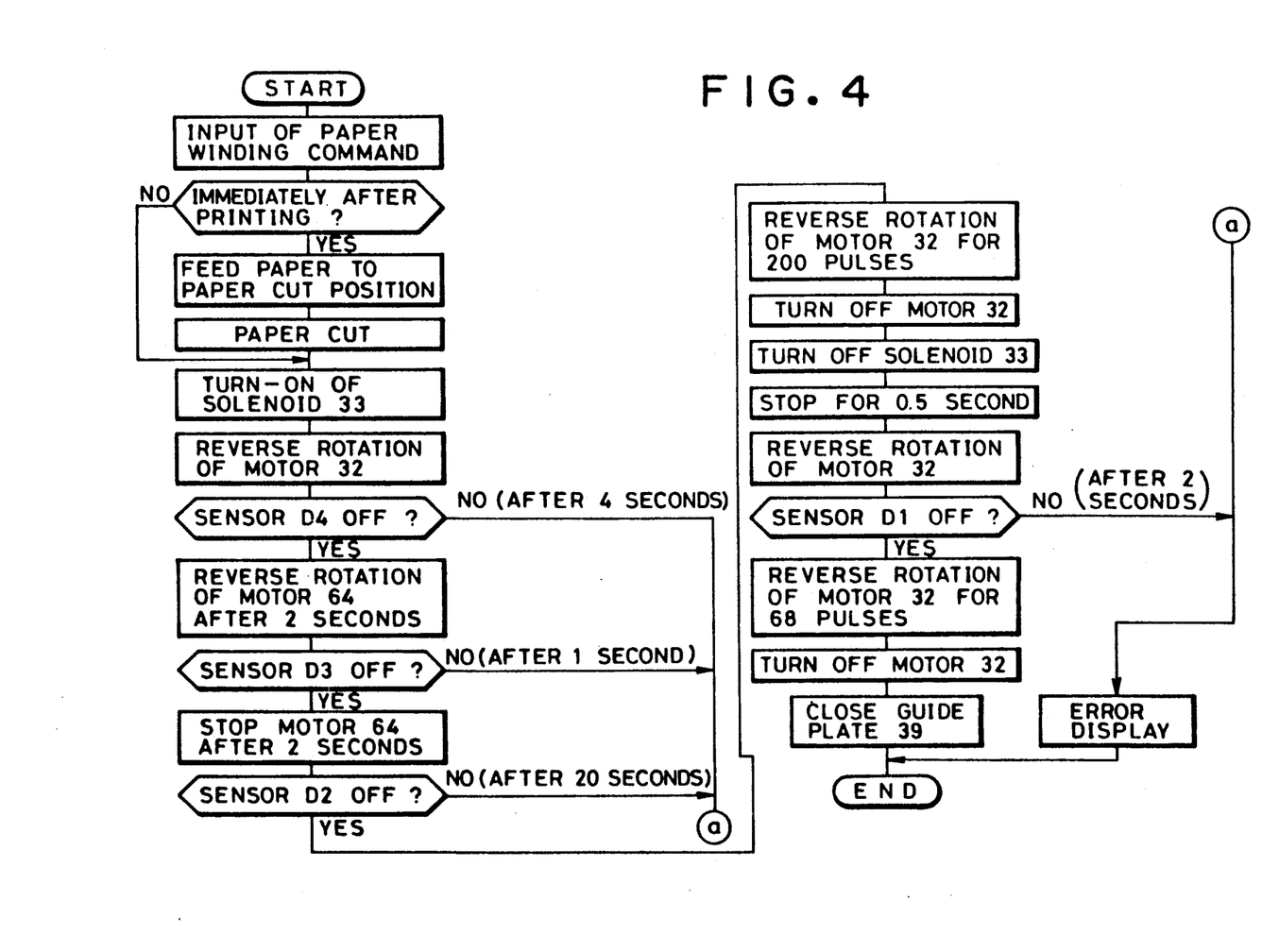
FIG. 4 is a flow chart of the control procedure performed by the controller during paper winding.
Figure 5:
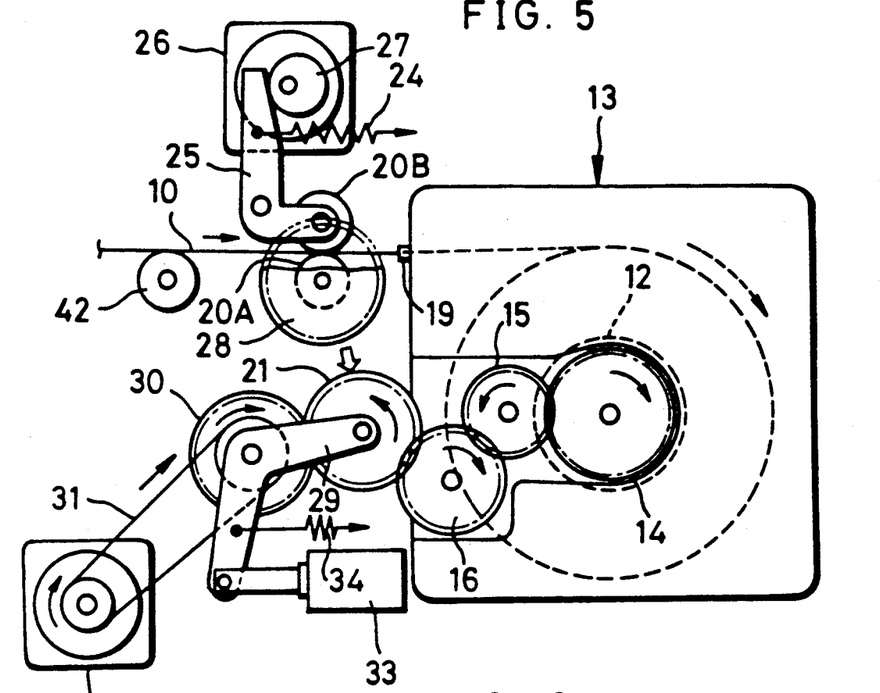
FIG. 5 is a front view showing the paper transporting apparatus during the first paper winding operation.

After the printed paper 10 is cut, the controller 100 causes the solenoid 33 to turn ON so that, as shown in FIG. 5, the epicyclic gear 21 is meshed with the gear 16 instead of with the previously meshed gear 28. Next, the auto-load motor 32 is rotated reversely to start the first paper winding operation so that the unprinted paper 10 is wound about the winding shaft 12 within the magazine 13. While winding the unprinted paper 10, when the loop amount at the first loop forming section 38 decreases to a predetermined amount, the loop sensor D4 turns OFF. Two seconds after from this turn-off, the controller 100 causes the main feed motor 64 of the first paper feeding unit 62 to rotate reversely so that the paper leading end at the cutter 75 moves back toward the magazine 13. As a result, the remaining unprinted paper 10 is wound about the winding shaft 12 within the magazine 13.

As the paper 10 is wound and the paper leading end passes the third paper sensor D3, the third paper sensor D3 turns OFF. Two seconds after this turn-off, the controller 100 stops the reverse rotation of the main feed motor 64. Until this time, the paper leading end has already passed the first paper feeding unit 62. Thereafter, the paper 10 is moved back into the magazine 13 only by the rotation of the winding shaft 12. As the paper leading end passes the second paper sensor D2, the second paper sensor D2 turns OFF. The auto-load motor 32 continues to rotate for a period corresponding to 200 pulses after the second paper sensor D2 turns OFF, and thereafter it is stopped. With this first paper winding operation, the paper leading end reaches a position 100 to 150 mm away from the paper outlet 19 of the magazine, the precise position depending on the outer diameter of the paper roll.

Figure 6:
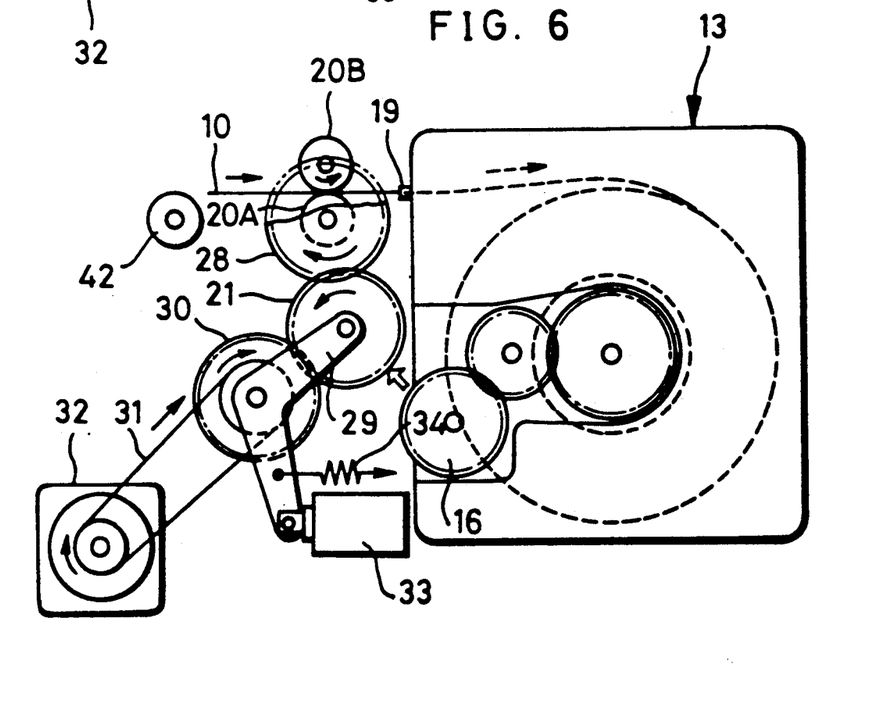
FIG. 6 is a front view like FIG. 5 showing the paper transporting apparatus during the second paper winding operation.

Next, the controller 100 causes the solenoid 33 to turn OFF so that, as shown in FIG. 6, the epicyclic gear 21 is switched from the side of the magazine 13 to the side of the nip roller pair 20. Since the nip roller pair 20 is coupled to the auto-load motor 32, the load on the nip roller pair 20 becomes large immediately, so that the paper roll, still rotating because of inertia, is stopped forcibly. 0.5 seconds after the turn-off of the solenoid 33, the auto-load motor 32 again is rotated reversely. As the nip roller pair 20 rotates, the second paper winding operation starts and the unprinted paper 10 enters forcibly into the magazine 13.

As the paper leading end is fed by the nip roller pair 20 and passes the first paper sensor D1, the first paper sensor D1 turns OFF. After the auto-load motor 32 rotates reversely for a period corresponding to 68 pulses, it is turned OFF. Then, the second paper winding operation is terminated. At this time, the paper leading end stays apart from the nip roller pair 20.

The controller 100 causes the nip release motor 26 to turn ON two seconds after the rotation of the auto-load motor 32 stops. Therefore, the eccentric cam 27 rotates, and the nip release lever 25 operates to move the upper nip roller 20B upwardly. When the nip release sensor D7 detects that the eccentric cam 27 rotates by one half of one rotation, the nip release motor 26 stops rotating. With this nip release, it is possible to insert the paper leading end between the nip roller pair 20 when another magazine is set. Lastly, the controller 100 causes the movable plate 39 to swing in the closed direction and take the guide position.

When the magazine 13 is picked up from the magazine chamber 18, the shutter plate 19A, moved by the spring force, fixes the portion of the paper leading end. Therefore, there is no fear that the paper leading end enters the magazine 13 completely during magazine unloading. If another magazine, storing a paper of a different type such as a different width or the like, is set in the magazine chamber 18, the paper auto-loading is carried out in the manner described above. In this embodiment, the paper leading end is not nipped by the nip roller pair 20, so that the magazine 13 can be unloaded from the magazine chamber 18 even if the nip roller pair 20 takes the nip state. Therefore, the nip release motor 26 may be operated by designating a nip release from the keyboard 101 prior to setting another magazine.

As described above, in the first paper winding operation, the paper leading end is wound back to a position 100 to 150 mm away from the paper outlet 19 of the magazine 13 while rotating the winding shaft 12 reversely. In the second paper winding operation, the paper leading end is entered forcibly into the magazine by means of the nip roller pair 20. As a result, the paper leading end is prevented from being wound within the magazine 13 because of inertia. Further, since the paper leading end stays away from the nip roller pair 20, the magazine 13 can be removed from the magazine chamber 18 irrespective of the state of the nip roller pair 20. In reloading the magazine 13 with the paper leading end being protruded to a small extent from the paper outlet 19, the paper leading end is pulled further in order to allow the paper leading end to be inserted between the nip roller pair 20.

Figure 7:
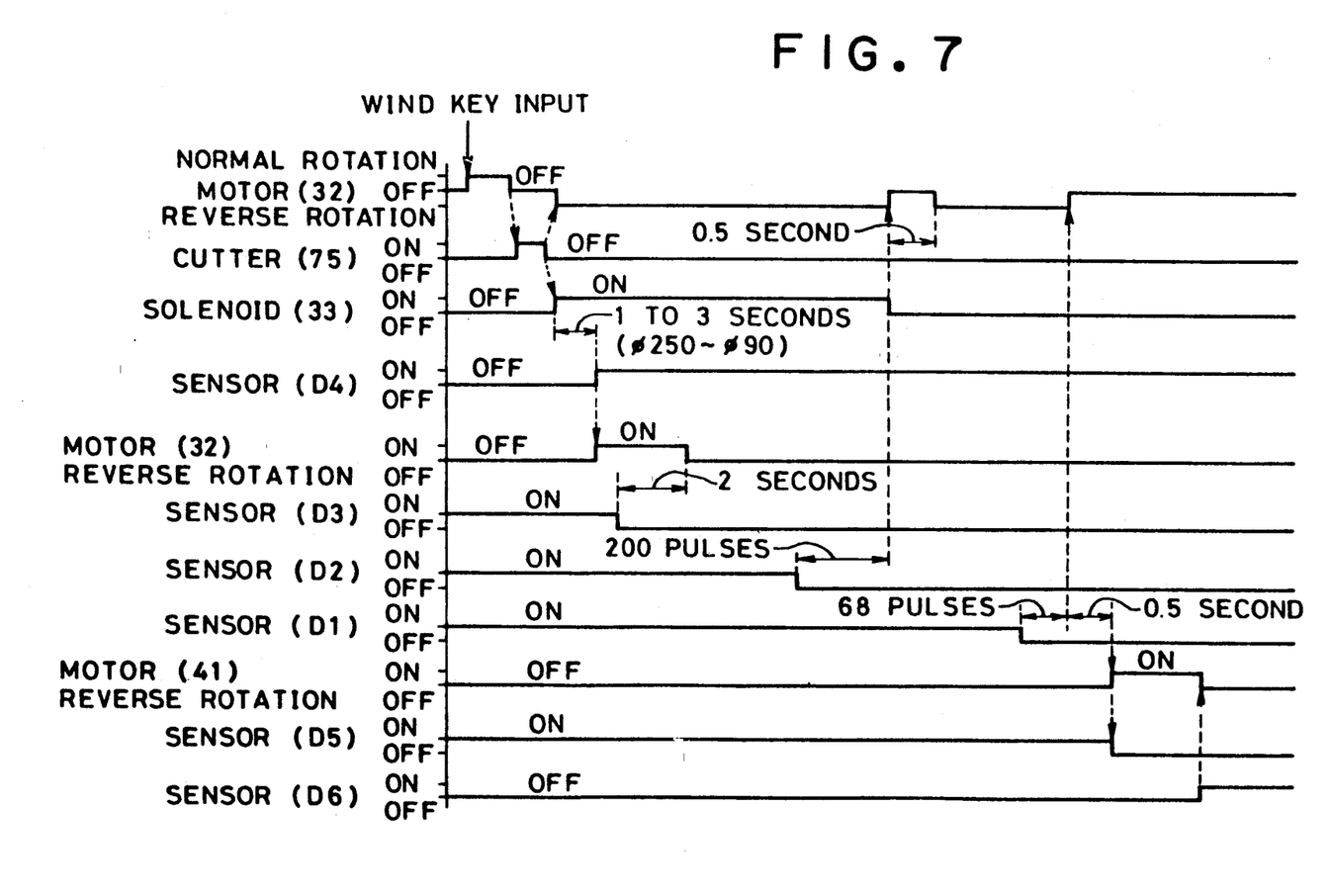
FIG. 7 is a timing chart showing the paper winding timing.

If the third paper sensor D3 does not turn OFF even one second after the main feed motor 64 starts its reverse rotation, if the second paper sensor D2 does not turn OFF even 20 seconds after the main feed motor 64 stops its reverse rotation, or if the first paper sensor D1 does not turn OFF even two seconds after the auto-load motor 32 starts its reverse rotation after the solenoid 33 was turned OFF, the controller judges winding to be impossible, and provides an error indication. The timings of the above-described winding operation at various elements are shown in the timing chart of FIG. 7.

In the above embodiment, the operation timing of the solenoid 33 is switched when the second paper sensor D2 detects that the paper leading end reaches a position 100 to 150 mm away from the paper outlet 19. The position of the second paper sensor D2 is not limited thereto, but may take a different position in view of the inertia of the paper roll of the magazine and of the winding driving system.

Figure 8:
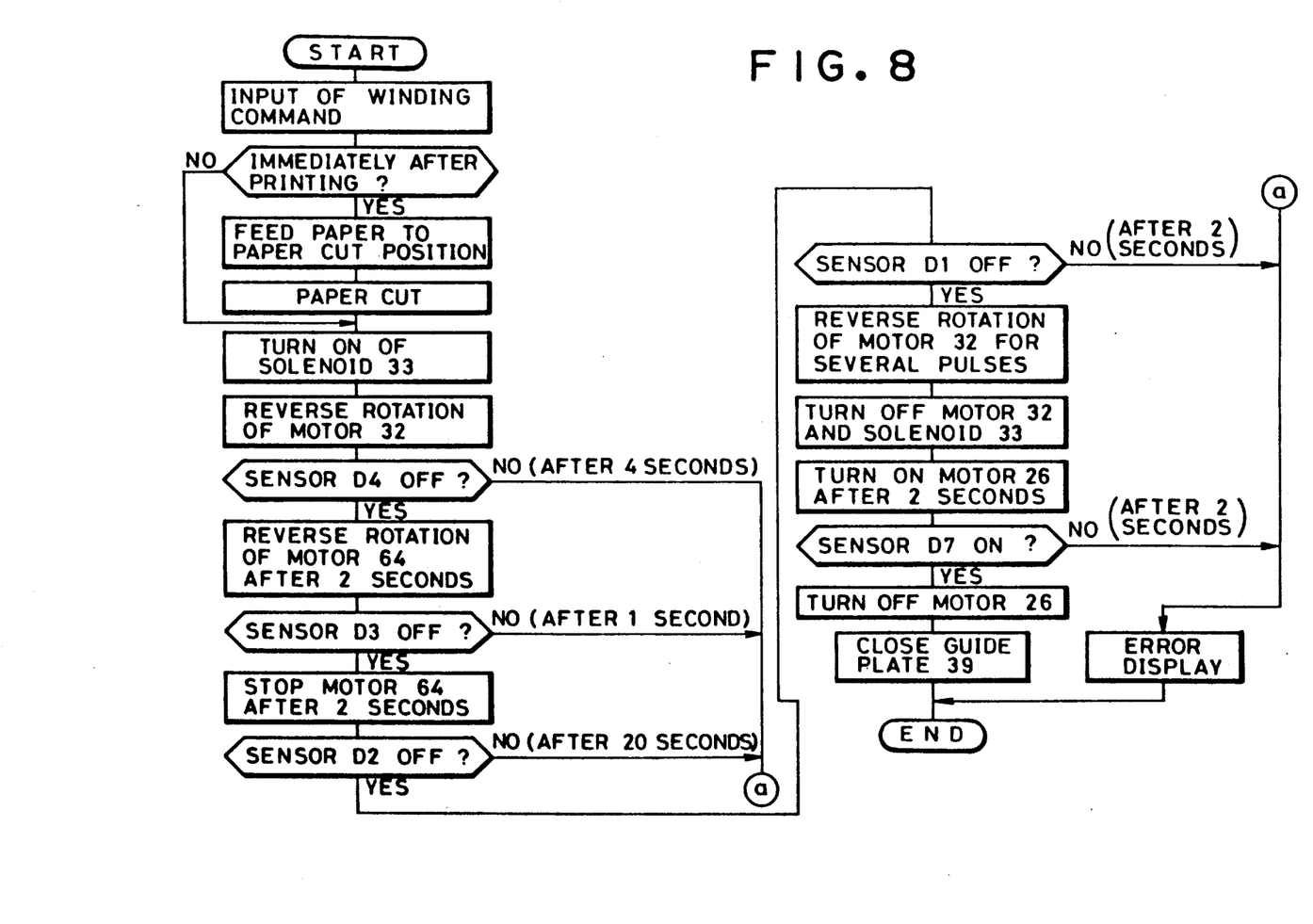
FIG. 8 is a flow chart, like FIG. 4, of the control procedure performed by the controller wherein the paper winding is stopped while a paper leading end is nipped with nip rollers, according to the second embodiment of this invention.
Figure 9:
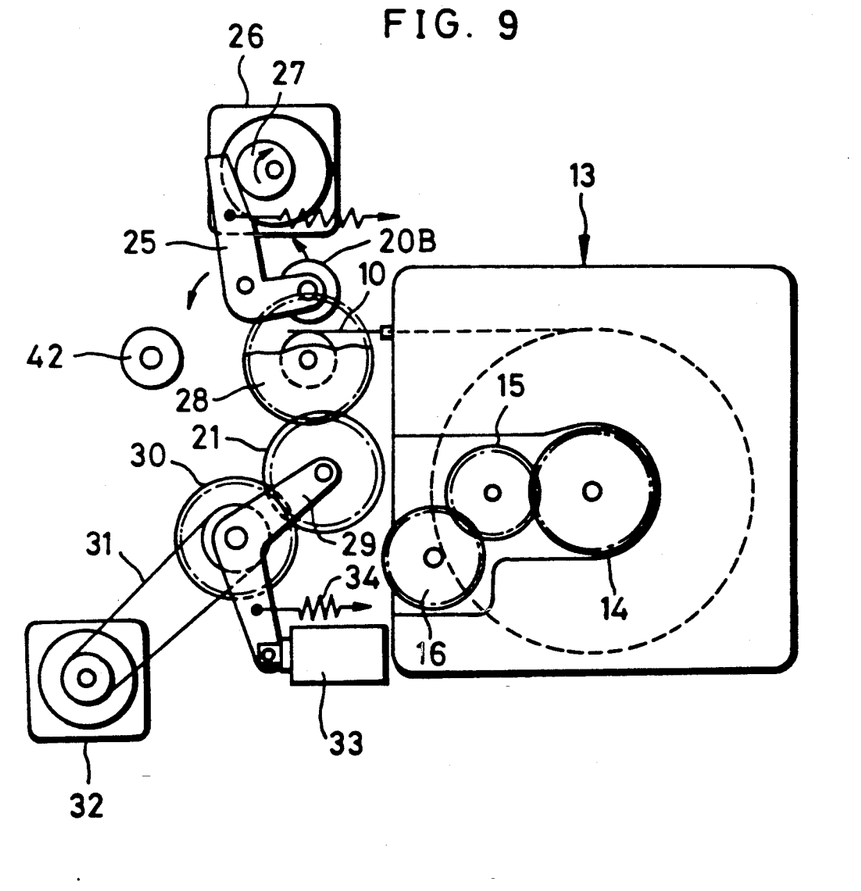
FIG. 9 is a front view like FIG. 5, wherein the nip rollers are set at a release position after the paper winding.
Figure 10:
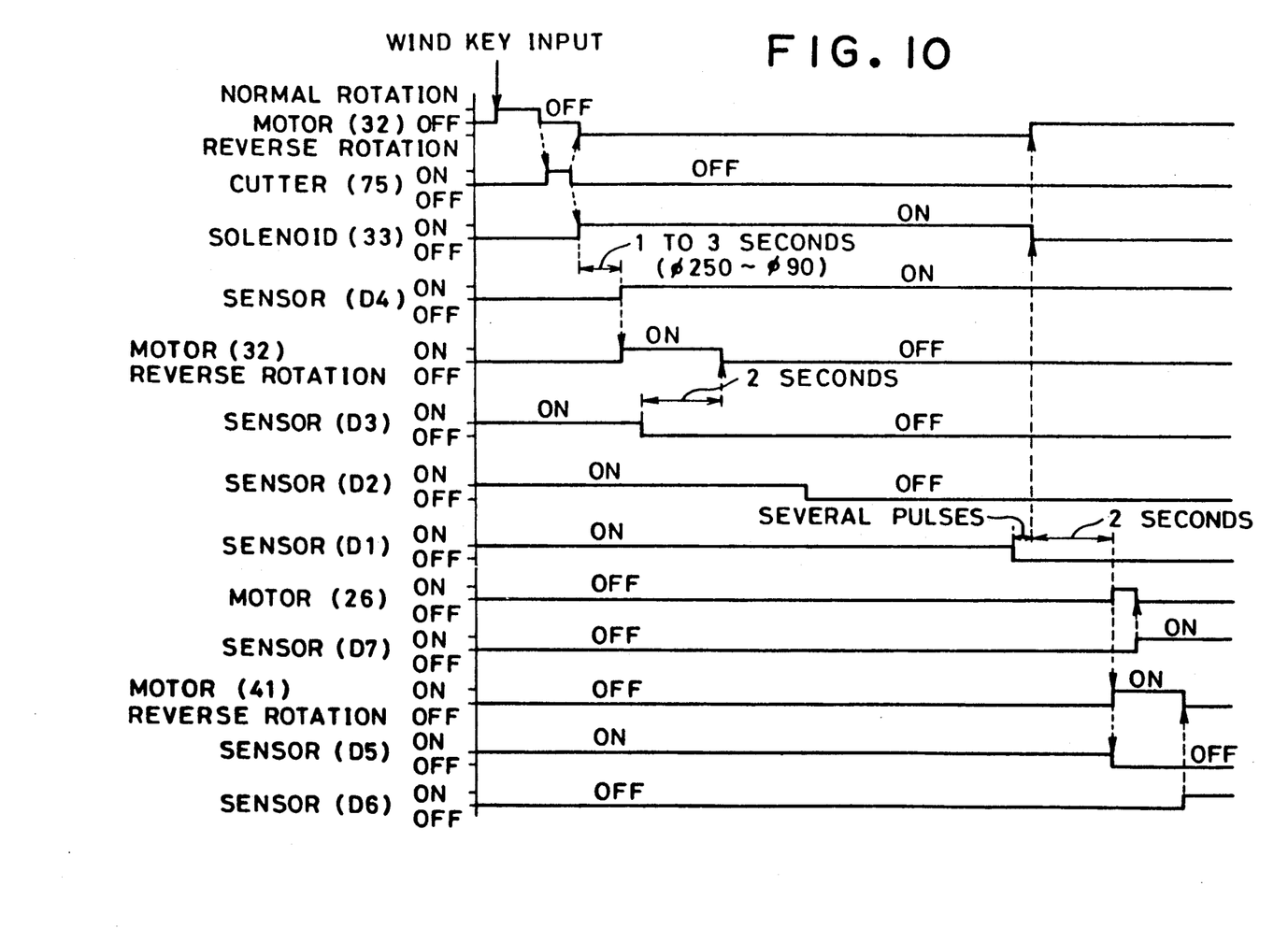
FIG. 10 is a timing chart showing paper winding timing according to the second embodiment of this invention.

In the above embodiment, the paper leading end portion protrudes from the paper outlet by a length which does not reach the nip roller pair 20. Therefore, if the magazine storing the wound paper is set again, it is necessary to pull the paper leading end a little. This problem can be solved by stopping the paper winding operation under the condition that the paper leading end is squeezed by the nip roller pair 20. FIGS. 8 to 10 illustrate an embodiment solving the problem in the above manner. In this embodiment, the operation from the winding start to the detection of the paper leading end by the second paper sensor D2 is the same as the first embodiment, but the succeeding operation differs from that of the first embodiment. Specifically, even after the paper leading end passes the second paper sensor D2, the winding operation continues by means of the auto-load motor 32. After the paper leading end passes the first paper sensor D1, the auto-load motor 32 continues to rotate for a period corresponding to several pulses after the turn-off of the first paper sensor D1, and stops thereafter. Then, the solenoid 33 is turned OFF, so that the epicyclic gear 21 meshes with the driver gear 28. As a result, the nip roller pair 20 in a free state receives a large load at once so that the paper roll rotating by the inertia can be stopped immediately. In this manner, the paper winding operation is terminated under the condition that the paper leading end is squeezed by the nip roller pair 20.

As described previously, the controller 100 causes the nip release motor 26 to turn ON after 2 seconds from when the auto-load motor 32 stops its rotation. The eccentric cam 27 shown in FIG. 9 rotates one half of one rotation to set the nip roller pair 20 to the nip release state. As a result, the paper leading end becomes free, and the magazine 13 can be unloaded from the magazine chamber 18. If the nip release sensor D7 does not turn ON two seconds after the rotation start of the nip release motor 26, the controller 100 judges nip release to be impossible, and provides an error indication.

In the above embodiments, the exposure station stands upright. However, the present invention is applicable to a printer processor having a horizontal exposure station. Further, the invention is applicable to a printer without a processor, printing-related apparatus using several types of roll paper.

In the above embodiment, the epicyclic gear 21 is switched by the solenoid 33, but also may be switched using a motor, such as a pulse motor, a DC motor, an AC motor, and the like. The motors may be controlled not only with pulses but also with time.

While the present invention has been described in detail with reference to a preferred embodiment, various modifications within the scope and spirit of the invention will be apparent to those of working skill in this technological field. Thus, the invention should be considered as limited only by the appended claims.

What is claimed is:

1. A method of transporting a photographic paper for a photographic printer, comprising the following steps:
   pulling photographic paper out of a magazine, said photographic paper being coiled on a winding shaft of said magazine, by coupling a motor to a pair of nip rollers disposed near said magazine to rotate said nip rollers nipping said photographic paper in a first direction, when feeding said photographic paper to an exposure station;
   cutting said photographic paper at a position upstream of a printed portion of said photographic paper;
   after said cutting step, moving said photographic paper back into said magazine;
   winding an unprinted portion of said photographic paper, obtained by said cutting step, about said winding shaft, by rotating said winding shaft in a winding direction, after releasing the coupling of said motor to said nip rollers and coupling said motor to said winding shaft; and
   moving said photographic paper forcibly into said magazine until said paper leading end detaches from said nip rollers, by rotating said nip rollers in a second direction, after releasing the coupling of said motor to said winding shaft and after coupling said motor to said nip rollers when the leading end of said unprinted portion nears said nip rollers.

2. A method according to claim 1, wherein said coupling of said motor selectively to said nip rollers and said winding shaft is performed by providing a clutch mechanism.

3. A method according to claim 2, further comprising the steps of providing a sensor near said nip rollers for detecting the leading end of said photographic paper, and, in response to a detection signal of said sensor, actuating said clutch mechanism to release said motor from said winding shaft and couple said motor to said nip rollers.

4. A method according to claim 3, further comprising the steps of providing a shutter mechanism disposed at a photographic paper outlet of said magazine, said shutter mechanism being closed to nip said photographic paper when said magazine is unloaded from a magazine chamber.

5. A method according to claim 4, further comprising the step of moving said nip rollers to a nip release position after said photographic paper has been wound, said moving step being prepared for setting a next magazine.

6. A method according to claim 5, wherein said photographic printer includes a printer section having said exposure station and a processing section for developing said photographic paper after said photographic paper is subjected to printing.

7. A method of transporting a photographic paper for a photographic printer, comprising the following steps:
pulling photographic paper out of a magazine, said photographic paper being coiled on a winding shaft of said magazine, by coupling a motor to a pair of nip rollers disposed near said magazine to rotate said nip rollers nipping said photographic paper in a first direction, when feeding said photographic paper to an exposure station;
cutting said photographic paper at a position upstream of a printed portion of said photographic paper;
after said cutting step, moving said photographic paper back into said magazine;
winding an unprinted portion of said photographic paper, obtained by said cutting, about said winding shaft, by rotating said winding shaft in a winding direction, after releasing a coupling of said motor to said nip rollers and coupling said motor to said winding shaft; and
terminating the winding operation of said photographic paper such that a leading end portion of said photographic paper is nipped by said nip rollers, by stopping the rotation of said motor when said paper leading end of said unprinted portion moves back near said nip rollers.

8. A method according to claim 7, further comprising the step of coupling said motor to said nip rollers immediately after said motor is stopped, so as to prevent said winding shaft from being rotated by inertia.

9. A method according to claim 8, further comprising the step of releasing a nipping of said leading end by said nip rollers after said photographic paper has been wound.

10. A method according to claim 9, wherein said coupling of nip rollers and said winding shaft selectively is performed by providing a clutch mechanism.

11. A method according to claim 10, further comprising the steps of providing a sensor for detecting the leading end of said photographic paper is disposed near at said nip rollers, and, in response to a detection signal of said sensor, actuating said clutch mechanism to release said motor from said winding shaft and couple said motor to said nip rollers.

12. A method according to claim 11, further comprising the step of providing a shutter mechanism disposed at a photographic paper outlet of said magazine, said shutter mechanism being closed to nip said photographic paper when said magazine is unloaded from a magazine chamber.

13. A method according to claim 12, wherein said photographic printer includes a printer section having said exposure station and a processing section for developing said photographic paper after said photographic paper is subjected to printing.

14. A method of transporting a photographic paper for a photographic printer, comprising the following steps:
pulling photographic paper out of a magazine, said photographic paper being coiled on a winding shaft of said magazine, by rotating a pair of nip rollers disposed near said magazine in a first direction in a state nipping said photographic paper, when feeding said photographic paper to an exposure station; and
moving said photographic paper back into said magazine, said moving step including the steps of:
A) cutting said photographic paper at a position upstream of a printed portion of said photographic paper;
B) winding an unprinted portion of said photographic paper, obtained by said cutting step, about said winding shaft, by rotating said winding shaft in a winding direction after freeing said nip rollers;
C) stopping the rotation of said winding shaft when a leading end of said unprinted portion comes near said nip rollers; and
D) forcibly moving said photographic paper into said magazine until said paper leading end detaches from said nip rollers, by rotating said nip rollers in a second direction after freeing said winding shaft.

15. A method of transporting a photographic paper for a photographic printer, comprising the following steps:
pulling photographic paper out of a magazine, said photographic paper being coiled on a winding shaft of said magazine, by rotating a pair of nip rollers disposed near said magazine in a first direction in a state nipping said photographic paper, when feeding said photographic paper to an exposure station; and
moving said photographic paper back into said magazine, said moving step including the steps of:
A) cutting said photographic paper at a position upstream of a printed portion of said photographic paper;
B) winding a unprinted portion of said photographic paper, obtained by said cutting step, about said winding shaft, by rotating said winding shaft in a winding direction after freeing said nip rollers;
C) freeing said winding shaft when a leading end of said unprinted portion returns to a position near said nip rollers;
D) terminating the winding of said photographic paper by stopping the rotation of said winding shaft caused by inertia with load applied to said nip rollers, the leading end portion of said photographic paper being nipped by said nip rollers; and
E) releasing the nipping of said photographic paper by said nip rollers after said photographic paper has been wound.

16. An apparatus for transporting a photographic paper for a photographic printer, said apparatus having a pair of nip rollers disposed rotatably near a magazine chamber and a motor for rotating said nip rollers, said apparatus feeding a photographic paper to an exposure station by rotating said nip rollers nipping said photographic paper in a first direction, and by pulling said photographic paper out of said magazine, said photographic paper being coiled on a winding shaft of said magazine, said apparatus comprising:

transmitting means for transmitting the rotation of said motor selectively to said nip rollers and said winding shaft;

cutting means for cutting said photographic paper at a position upstream of a printed portion of said photographic paper, prior to moving said photographic paper back to said magazine; and     controlling means for controlling said motor and said transmitting means, said controlling means moving said photographic paper back into said magazine by coupling said motor to said winding shaft to rotate said winding shaft, by coupling said motor to said nip rollers when the leading end of an unprinted portion of said photographic paper obtained by said cutting means nears said nip rollers, and by rotating said nip rollers in a second direction until said leading end of said photographic paper moves away from said nip rollers.

17. An apparatus according to claim 16, wherein said transmitting means comprises:

a sun gear rotated by said motor;

an epicyclic gear meshing with said sun gear;

a first gear fixedly mounted on said winding shaft;

a second gear fixedly mounted on said nip rollers;

a lever for rotatably supporting said epicyclic gear, said lever swinging about said sun gear to bring said epicyclic gear in mesh selectively with said first and second gears; and     means for swinging said lever.

18. An apparatus according to claim 17, wherein said lever swinging means comprises a solenoid.

19. An apparatus according to claim 18, further comprising a sensor, disposed near said nip rollers, for detecting the leading end of said photographic paper, wherein, in response to a detection signal of said sensor, said solenoid is actuated to release said motor from said winding shaft and couple said motor to said nip rollers.

20. An apparatus according to claim 18, wherein said magazine includes a shutter mechanism disposed at a photographic paper outlet thereof, said shutter mechanism being closed to nip said photographic paper when said magazine is unloaded from a magazine chamber.

21. An apparatus according to claim 20, further comprising means for moving said nip rollers to a nip release position after said photographic paper has been wound, said nip rollers moving means being prepared for setting a next magazine.

22. An apparatus for transporting a photographic paper for a photographic printer, said apparatus having a pair of nip rollers rotatably disposed near a magazine chamber and a motor for rotating said nip rollers, said apparatus feeding a photographic paper to an exposure station by rotating said nip rollers nipping said photographic paper in a first direction, and by pulling said photographic paper out of said magazine, said photographic paper being coiled on a winding shaft of said magazine, said apparatus comprising:

transmitting means for transmitting the rotation of said motor selectively to said nip rollers and said winding shaft;

cutting means for cutting said photographic paper at a position upstream of a printed portion of said photographic paper, prior to moving said photographic paper back to said magazine; and     controlling means for controlling said motor and said transmitting means, said controlling means moving said photographic paper back into said magazine by coupling said motor to said winding shaft to rotate said winding shaft, by stopping said motor when the leading end of an unprinted portion of said photographic paper obtained by said cutting means nears said nip rollers, and by coupling said motor to said nip rollers to stop the rotation of said winding shaft by inertia such that winding said photographic paper is terminated under the condition that the photographic paper end portion is nipped by said nip rollers.

23. An apparatus according to claim 22, further comprising means for releasing the nipping of the leading end of said photographic paper by said nip rollers after said photographic paper has been wound.

24. An apparatus according to claim 23, wherein said transmitting means comprises:

a sun gear which is rotated by said motor;

an epicyclic gear meshing with said sun gear;

a first gear fixedly mounted on said winding shaft;

a second gear fixedly mounted on said nip rollers;

a lever for rotatably supporting said epicyclic gear, said lever swinging about said sun gear to bring said epicyclic gear in mesh selectively with said first and second gears; and     means for swinging said lever.

25. An apparatus according to claim 24, wherein said lever swinging means comprises a solenoid.

26. An apparatus according to claim 25, further comprising a sensor, disposed near said nip rollers, for detecting the leading end of said photographic paper, wherein, in response to a detection signal of said sensor, said lever swinging means is actuated to release said motor from said winding shaft and couple said motor to said nip rollers.

27. An apparatus according to claim 26, wherein said magazine includes a shutter mechanism disposed at a photographic paper outlet thereof, said shutter mechanism being closed to nip said photographic paper when said magazine is dismounted from a magazine chamber.

* * * * *